(12) United States Patent
Kawata

(10) Patent No.: US 10,401,560 B2
(45) Date of Patent: Sep. 3, 2019

(54) DISPLAY DEVICE INCLUDING AN INSULATING SUBSTRATE AND A PIXEL ELECTRODE

(71) Applicant: Japan Display Inc., Minato-ku (JP)

(72) Inventor: Yasushi Kawata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/988,900

(22) Filed: Jan. 6, 2016

(65) Prior Publication Data

US 2016/0209582 A1     Jul. 21, 2016

(30) Foreign Application Priority Data

Jan. 15, 2015   (JP) ................................ 2015-005636

(51) Int. Cl.
| | | |
|---|---|---|
| *G02F 1/136* | (2006.01) | |
| *G02F 1/1333* | (2006.01) | |
| *G02F 1/1335* | (2006.01) | |
| *G02F 1/1339* | (2006.01) | |

(Continued)

(52) U.S. Cl.
CPC ......... *G02B 6/0091* (2013.01); *G02B 6/0028* (2013.01); *G02F 1/136* (2013.01);
(Continued)

(58) Field of Classification Search
CPC combination set(s) only.
See application file for complete search history.

(56) References Cited

U.S. PATENT DOCUMENTS

2002/0075442 A1* 6/2002 Yanagawa ............. G02F 1/1333
                                                    349/155
2005/0018102 A1* 1/2005 Hirano ................ G02F 1/13452
                                                    349/58
(Continued)

FOREIGN PATENT DOCUMENTS

JP        55-57702 U      4/1980
JP        9-325336 A     12/1997
(Continued)

OTHER PUBLICATIONS

Office Action dated Oct. 30, 2018 in Japanese Patent Application No. 2015-005636 7 pages ( with unedited computer generated English Translation provided by Global Dossier).

(Continued)

*Primary Examiner* — Lauren Nguyen
(74) *Attorney, Agent, or Firm* — Oblon, McClelland, Maier & Neustadt, L.L.P.

(57) ABSTRACT

An illumination device according to one embodiment includes a backlight and a display panel configured to selectively transmit light from the backlight. The backlight includes a light source, a main light guide portion formed in the shape of a flat plate and an approach portion. The main light guide portion includes a first surface facing the display panel, and a second surface opposite to the first surface. The approach portion includes a third surface facing the second surface, a fourth surface opposite to the third surface, a first end portion facing the light source, and a second end portion opposite to the first end portion, and connected to the main light guide portion, the fourth surface being inclined with respect to the third surface.

11 Claims, 11 Drawing Sheets

(51) Int. Cl.
*G02F 1/1343* (2006.01)
*G02F 1/1345* (2006.01)
*F21V 8/00* (2006.01)

(52) U.S. Cl.
CPC .......... *G02F 1/1339* (2013.01); *G02F 1/1345* (2013.01); *G02F 1/13452* (2013.01); *G02F 1/133345* (2013.01); *G02F 1/134309* (2013.01); *G02B 6/0031* (2013.01); *G02B 6/0083* (2013.01); *G02F 1/133615* (2013.01)

(56) References Cited

U.S. PATENT DOCUMENTS

| | | | | |
|---|---|---|---|---|
| 2006/0221269 | A1* | 10/2006 | Kawaguchi | G02F 1/133308 349/58 |
| 2007/0035473 | A1* | 2/2007 | Yamazaki | G02F 1/13318 345/4 |
| 2009/0290328 | A1* | 11/2009 | Ueyama | G02B 6/0028 362/97.3 |
| 2012/0224117 | A1* | 9/2012 | Miyazaki | G02F 1/13318 349/58 |
| 2014/0314376 | A1 | 10/2014 | Ning | |
| 2015/0160500 | A1* | 6/2015 | Ikuta | G02F 1/13452 349/150 |

FOREIGN PATENT DOCUMENTS

| | | | |
|---|---|---|---|
| JP | 11-281996 | A | 10/1999 |
| JP | 2003-242820 | A | 8/2003 |
| JP | 2004-119031 | | 4/2004 |
| JP | 2004-158336 | A | 6/2004 |
| JP | 2004-527096 | A | 9/2004 |
| JP | 2005-63423 | A | 3/2005 |
| JP | 2005-115337 | A | 4/2005 |
| JP | 2006-221922 | A | 8/2006 |
| JP | 2007-47714 | A | 2/2007 |
| JP | 4636568 | | 2/2011 |
| JP | 2012-123995 | * | 6/2012 |
| JP | 2012-185242 | A | 9/2012 |
| WO | WO-2014-024440 | * | 2/2014 ........... G02F 1/1345 |

OTHER PUBLICATIONS

Office Action dated Jan. 15, 2019 in the corresponding Japanese Patent Application No. 2015-005636 with Unedited Computer-Generated English Translation 5 pages.

* cited by examiner

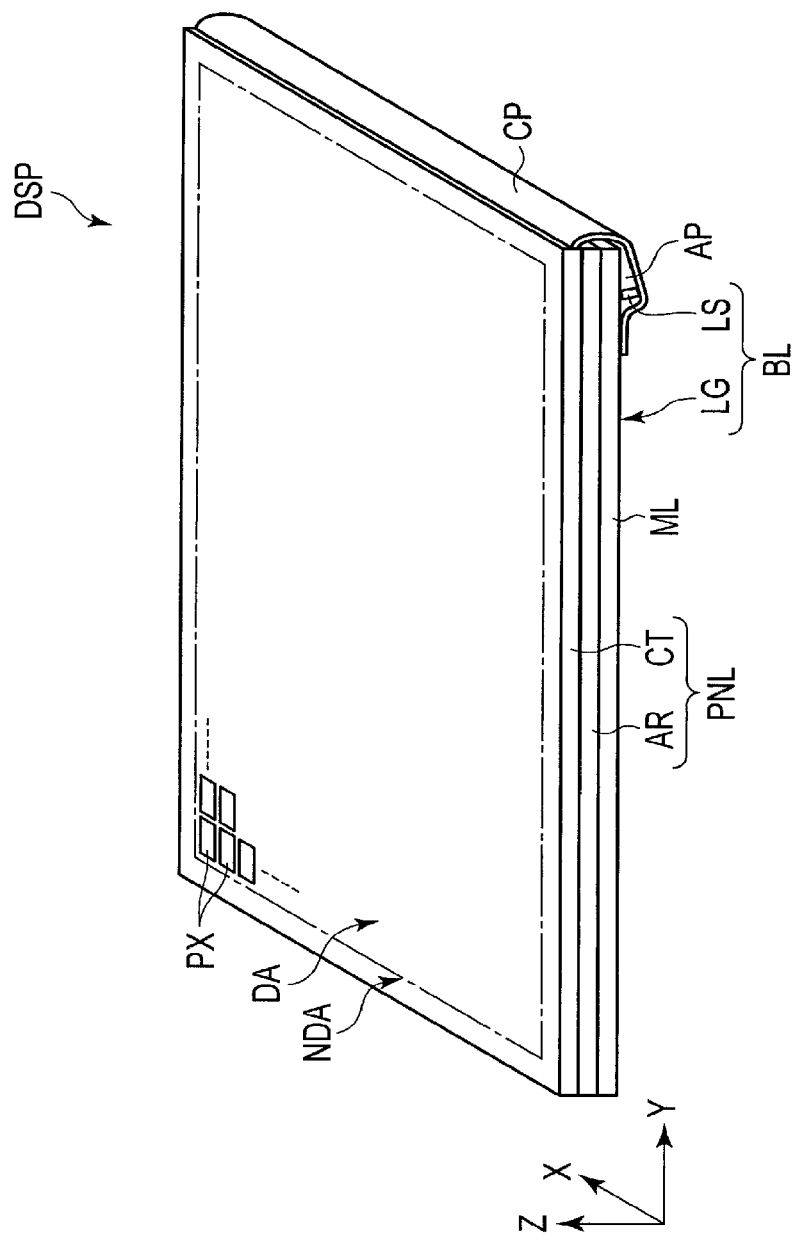
F I G. 1

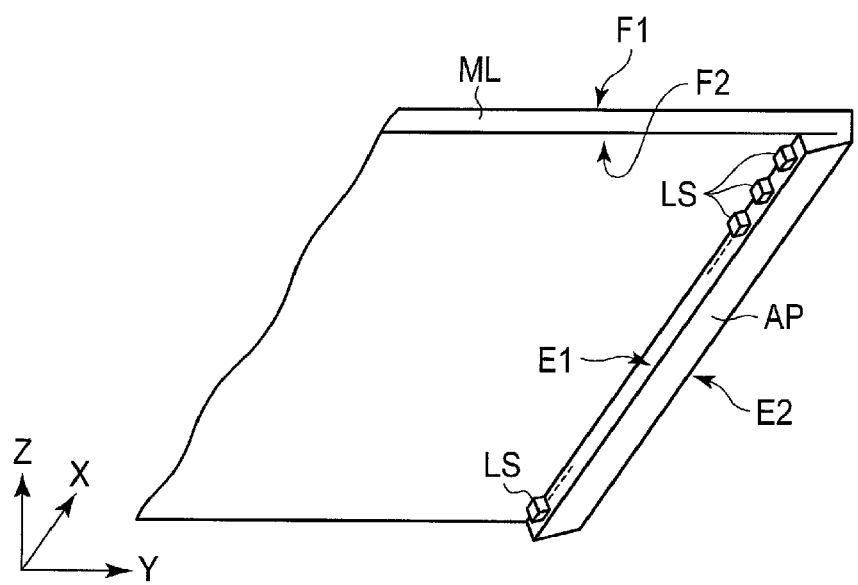
F I G. 2

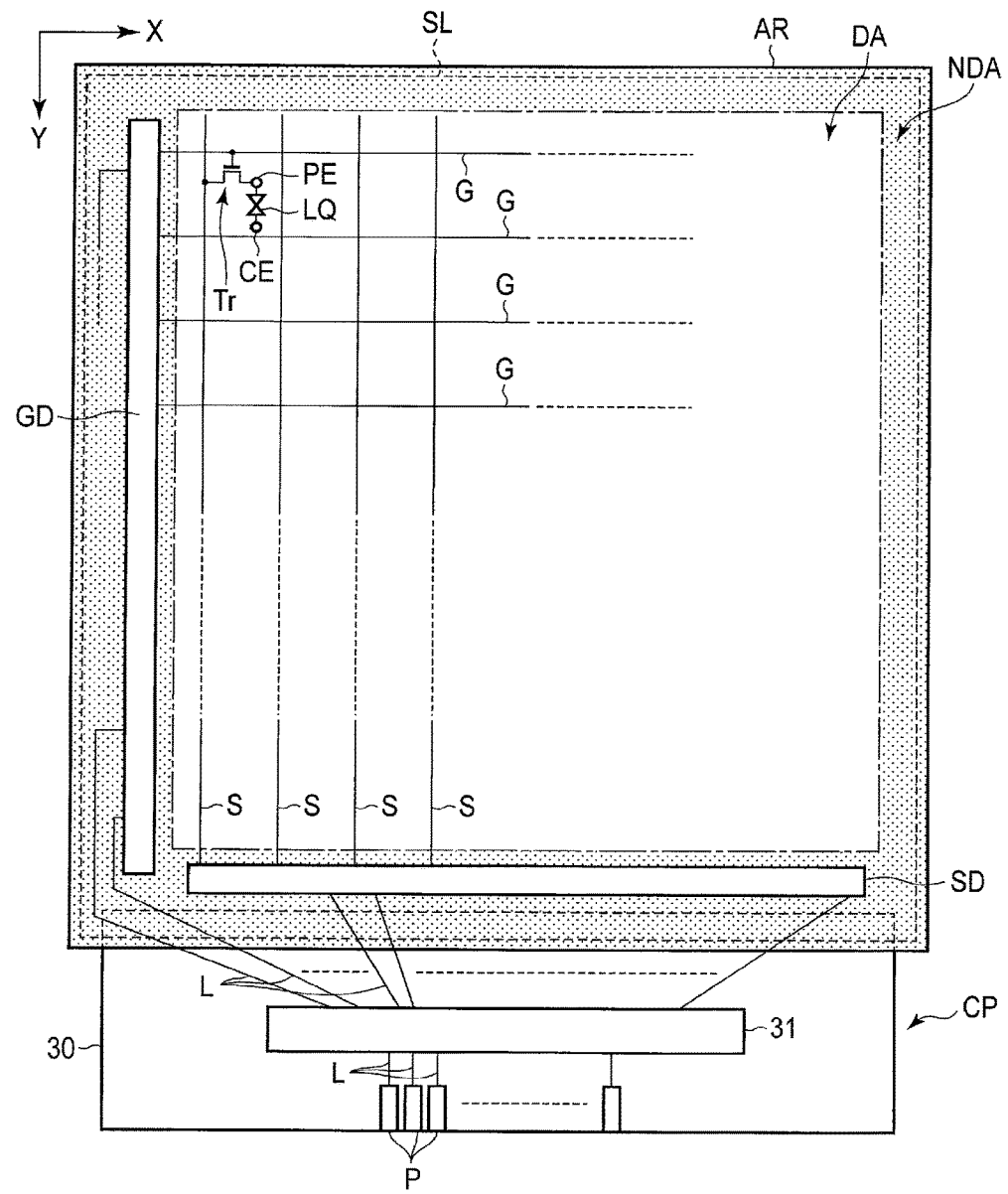
F I G. 3

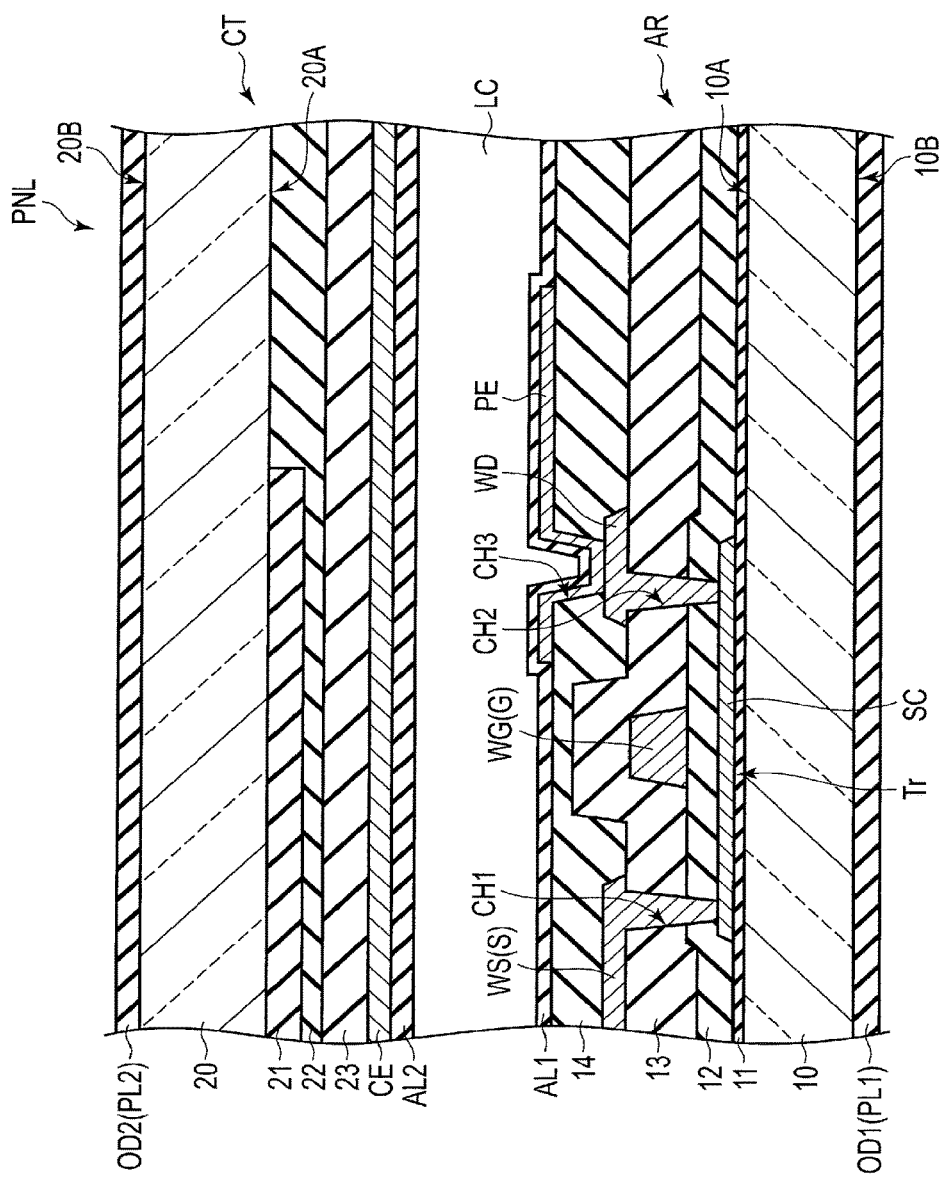
F I G. 4

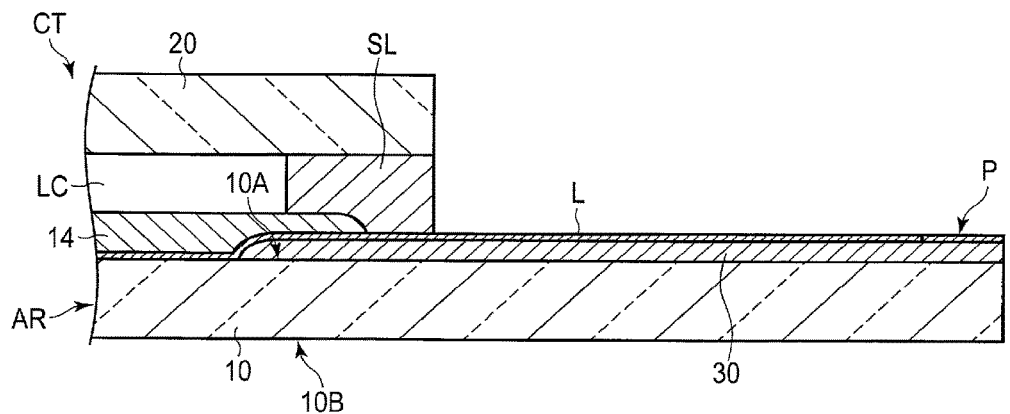
F I G. 6
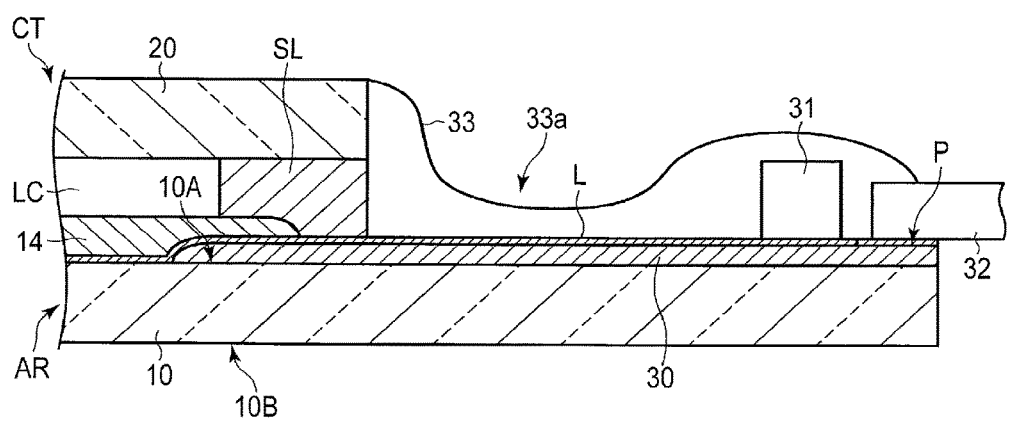
F I G. 7

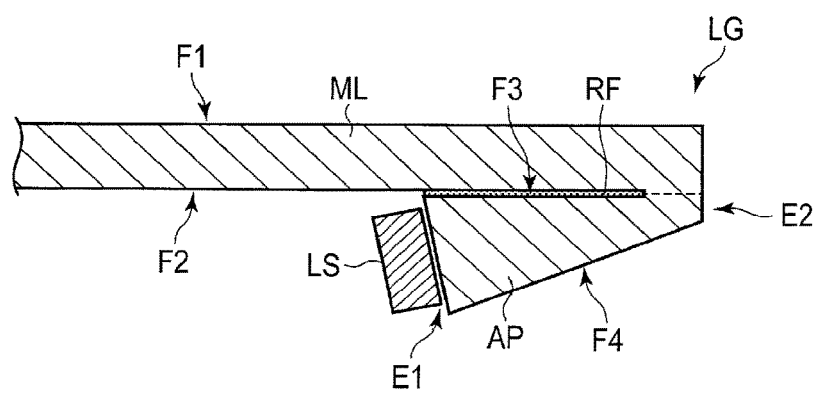
F I G. 11

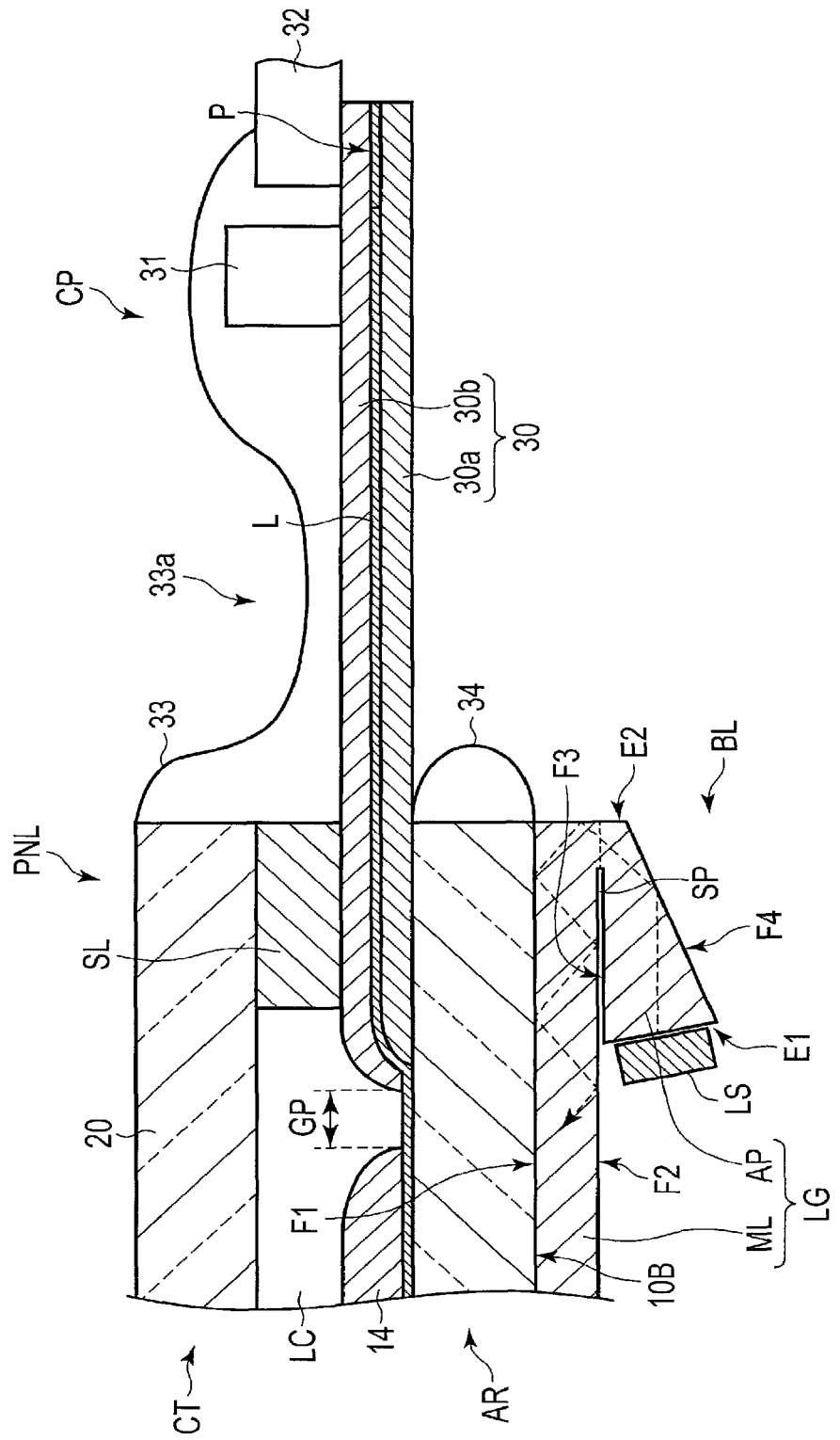
F I G. 13

DISPLAY DEVICE INCLUDING AN INSULATING SUBSTRATE AND A PIXEL ELECTRODE

CROSS-REFERENCE TO RELATED APPLICATIONS

This application is based upon and claims the benefit of priority from Japanese Patent Application No. 2015-005636, filed Jan. 15, 2015, the entire contents of which are incorporated herein by reference.

FIELD

Embodiments described herein relate generally to a display device and an illumination device.

BACKGROUND

Conventionally, flat panel display devices incorporated in various devices or apparatuses are required to have a narrower region surrounding a display area in which an image is to be displayed (the region surrounding the display area will be hereinafter referred to as a frame region) in view of the function, design, etc., of each device.

In a display device which displays an image, using light from an illumination device such as a surface light source backlight, which is joined to a display panel, in order to make a frame region narrow, it is necessary to optimize in design not only the display panel, but the illumination device.

BRIEF DESCRIPTION OF THE DRAWINGS

FIG. 1 is a perspective view schematically showing a liquid crystal display device according to a first embodiment.

FIG. 2 is a view schematically showing an example of part of a backlight as viewed from a reverse side of a main light guide portion.

FIG. 3 is a plan view schematically showing a configuration of an array substrate as shown in FIG. 1 and an equivalent circuit of a pixel.

FIG. 4 is a view schematically showing an example of the cross section of a liquid crystal display panel.

FIG. 6 is a view for explaining an example of a process of a method of manufacturing the liquid crystal display panel and the liquid crystal display device.

FIG. 7 is a view for explaining an example of another process of the method of manufacturing the liquid crystal display panel and the liquid crystal display device.

FIG. 11 is a view schematically showing the cross section of part of a light guide plate in a third embodiment, which includes an end portion thereof and the vicinity of the end portion.

FIG. 13 is a view schematically showing the cross section of part of a liquid crystal display device according to a fifth embodiment, which includes an end portion thereof and the vicinity of the end portion.

DETAILED DESCRIPTION

Figure 5:
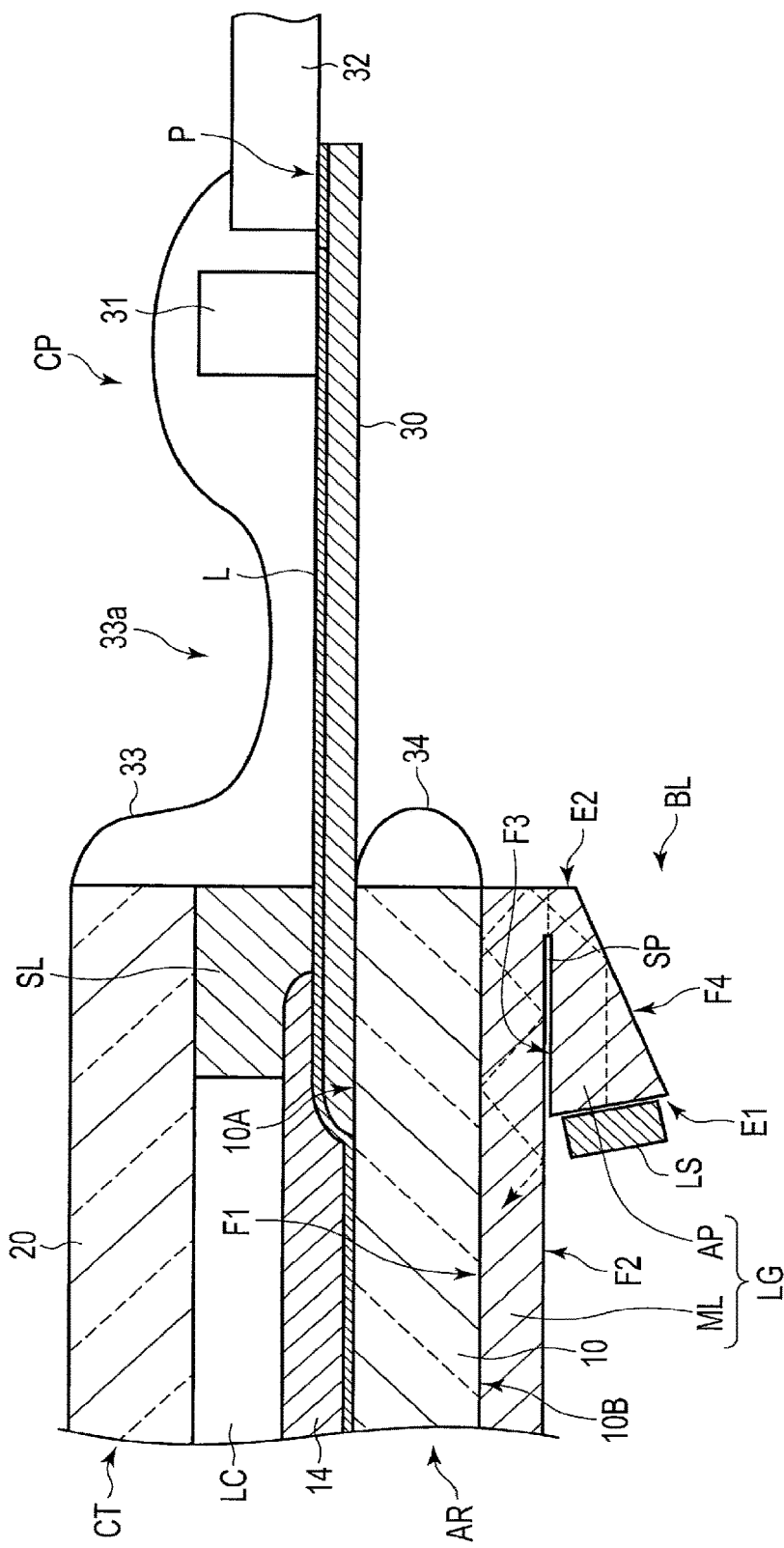
FIG. 5 is a view schematically showing the cross section of part of a liquid crystal display device, which includes an end portion thereof at which a connector is provided and the vicinity of the end portion.

In general, according to one embodiment, a display device comprises a backlight and a display panel configured to selectively transmit light from the backlight. The backlight comprises a light source, a main light guide portion formed in the shape of a flat plate and an approach portion. The main light guide portion includes a first surface facing the display panel, and a second surface opposite to the first surface. The approach portion includes a third surface facing the second surface, a fourth surface opposite to the third surface, a first end portion facing the light source, and a second end portion opposite to the first end portion, and connected to the main light guide portion, the fourth surface being inclined with respect to the third surface.

Furthermore, according to one embodiment, an illumination device comprises a light source, a main light guide portion formed in the shape of a flat plate and an approach portion. The main light guide portion includes a first surface and a second surface opposite to the first surface. The approach portion includes a third surface facing the second surface, a fourth surface opposite to the third surface, a first end portion facing the light source, and a second end portion opposite to the first end portion, and connected to the main light guide portion, the fourth surface being inclined with respect to the third surface. Light from the light source enters the approach portion from the first end portion, propagates in the approach portion toward the second end portion, then enters the main light guide portion, propagates in the main light guide portion, and exits from the first surface.

Some embodiments will be explained with reference to the accompanying drawings.

The disclosure is a mere example, and arbitrary change of gist which can be easily conceived by a person of ordinary skill in the art naturally falls within the inventive scope. To better clarify the explanations, the drawings may pictorially show width, thickness, shape, etc., of each portion as compared with an actual aspect, but they are mere examples and do not restrict the interpretation of the invention. In some cases, in each of the drawings, reference numbers of identical or similar elements, which are successively disposed, are omitted. In the specification and drawings, after structural elements are each explained once with reference to any of the drawings, there is a case where their explanations will be omitted as appropriate, and those identical to or similar to the explained structural elements will be denoted by the same reference numbers, respectively, as the explained structural elements.

With respect to each of the embodiments, a transmissive liquid crystal display device will be described as an example of the display device. The liquid crystal display device can be used in various devices such as a smartphone, a tablet computer, a cell phone, a personal computer, a television receiver, in-vehicle equipment and a games console. It should be noted that main structural elements described later with respect to each of the embodiments can be used in another type of transmissive display device such as a display device to which micro-electro mechanical systems (MEMS) are applied. Also, with respect to each embodiment, a backlight of the liquid crystal display device will be described as an example of the illumination device.

First Embodiment

FIG. 1 is a perspective view schematically showing a liquid crystal display device DSP according to the first embodiment. The liquid crystal display device DSP comprises an active-matrix liquid crystal display panel PNL and a backlight BL. In the example shown in FIG. 1, the liquid crystal display panel PNL and the backlight BL are formed in the shape of a rectangle having a pair of sides along a first direction X and a pair of sides along a second direction Y perpendicular to the first direction X; and they are stacked together in a third direction Z perpendicular to the first direction X and the second direction Y. In the liquid crystal display panel PNL and the backlight BL, the sides along the first direction X are, for example, short sides, and the sides along the second direction Y are, for example, long sides. The shapes of the liquid crystal display panel PNL and the backlight BL are not limited to a rectangle; that is, they may be formed in another shape.

The liquid crystal display panel PNL comprises an array substrate AR, a counter-substrate CT located opposite to the array substrate AR, and a liquid crystal layer (liquid crystal layer LC to be described later) located between the array substrate AR and the counter-substrate CT. In the first embodiment, the array substrate AR is a first substrate, and the counter-substrate CT is a second substrate.

The liquid crystal display panel PNL as shown in FIG. 1 is, for example, a transmissive display panel which displays an image, using light from the backlight unit BL. However, the liquid crystal display panel PNL may be made to have the function of a reflective display panel which displays an image, using natural light (external light) or light from a front light, in addition to the function of the transmissive display panel.

The liquid crystal display panel PNL includes a display area DA where an image is displayed, and a non-display area NDA surrounding the display area DA. The display area DA can also be referred to as an active area. The non-display area NDA can also be referred to as a frame area.

The liquid crystal display panel PNL includes a plurality of pixels PX in the display area DA. The pixels PX are arranged in a matrix in, for example, the first direction X and the second direction Y.

For example, the length of each of the sides of the array substrate AR in the first direction X are substantially equal to that of each of the sides of the counter-substrate CT in the first direction X. Also, the length of each of the sides of the array substrate AR in the second direction Y is substantially equal to that of each of the sides of the counter-substrate CT in the second direction Y. That is, in the X-Y plane, the area of the array substrate AR is substantially equal to that of the counter-substrate CT. In addition, the sides of the array substrate AR are substantially aligned with those of the counter-substrate CT in the third direction Z.

Furthermore, the liquid crystal display panel PNL includes a connector CP extending from one of the sides of the liquid crystal display panel PNL. The liquid crystal display panel PNL and the connector CP are electrically connected to each other. In the example shown in FIG. 1, the connector CP extends from one of the short sides of the liquid crystal display panel PNL, which extend along the first direction X.

Furthermore, the connector CP has flexibility. In the example of FIG. 1, the connector CP is bent in such a manner to extend over a reverse surface of the backlight BL. For example, the length of a side of the connector CP which extends along the first direction X is equal to or less than that of a side of the counter-substrate CT which extends along the first direction X.

The backlight BL comprises a light source LS and a light guide plate LG. For example, the light source is a light emitting diode; however, it is not limited to the light emitting diode. The light guide plate LG includes a main light guide portion ML and an approach portion AP. The main light guide portion ML is formed in the shape of a flat plate, and as viewed in plan view, the main light guide portion ML and the display area DA are located in corresponding positions. The approach portion AP and the light source LS are provided on the reverse surface of the main light guide portion ML, i.e., on a surface of the main light guide portion ML, which does not face the liquid crystal display panel PNL.

For example, the length of a side of the main light guide portion ML which extends along the first direction X is substantially equal to that of each of sides of the array substrate AR and counter-substrate CT which extend along the first direction X. Furthermore, the length of a side of the main light guide portion ML which extends along the second direction Y is substantially equal to that of each of sides of the array substrate AR and counter-substrate CT which extend along the second direction Y. That is, in the X-Y plane, the area of the main light guide portion ML is substantially equal to that of each of the array substrate AR and the counter-substrate CT. Furthermore, the sides of the main light guide portion ML are substantially aligned with those of the array substrate AR and the counter-substrate CT in the third direction Z.

FIG. 2 is a schematic bottom view of an example of part of the backlight BL. The main light guide portion ML includes a first surface F1 which faces the liquid crystal display panel PNL and a second surface F2 which is located opposite to the first surface and corresponds to the above reverse surface. The approach portion AP includes a first end portion E1 which faces a center side of the main light guide portion ML in the X-Y plane, and a second end portion E2 which is located opposite to the first end portion E1. The approach portion AP is physically connected to the main light guide portion ML on the second end portion E2 side. In the example shown in FIG. 2, a plurality of light sources LS are arranged at, for example, regular intervals, along the first end portion E1. Light emitting surfaces of the light sources LS face the first end portion E1. The light sources LS are mounted on, for example, a flexible wiring board, and emits light upon reception of a voltage from the board. The light sources LS do not need to emit light at the same time, and they may selectively emit light.

Light emitted from a light source LS enters the approach portion AP from the first end portion E1, and exits from the second end portion E2 to enter the main light guide portion ML. The light then propagates in the main light guide portion ML, and exits from the first surface F1. That is, the backlight BL functions as a surface light source device which illuminates the liquid crystal display panel PNL. The liquid crystal display panel PNL displays an image on the display area DA by selectively transmitting light from the main light guide portion ML.

FIG. 3 is a plan view schematically showing a configuration of the array substrate AR as shown in FIG. 1 and an equivalent circuit of pixel electrodes PX. In the array substrate AR, the array substrate AR comprises a plurality of gate lines G extending in the first direction X and arranged in the second direction Y and a plurality of source lines S extending in the second direction Y and arranged in the first direction X. Each of the pixels PX is defined by, for example, two adjacent gate lines G and two adjacent source lines S.

In each pixel PX, the array substrate AR comprises a thin-film transistor Tr electrically connected to a gate line G and a source line S and a pixel electrode PE electrically connected to the thin-film transistor Tr. The thin-film transistor Tr functions as a switching element. Between the pixel electrode PE and a common electrode CE provided for a plurality of pixels PX, an electric field is generated which drives a liquid crystal layer LC. The common electrode CE may be provided in either the counter-substrate CT or the array substrate AR. The array substrate AR is connected to the counter-substrate CT by a sealing member SL provided along, for example, four sides of each of those substrates. The liquid crystal layer LC is provided between the array substrate AR and the counter-substrate such that space between those substrates is sealed by the sealing member SL.

Furthermore, the array substrate AR comprises a gate driver GD electrically connected to the gate lines G, a source driver SD electrically connected to the source lines S and a plurality of connection lines L electrically connected to the gate driver GD and the source driver SD. In the example shown in FIG. 3, the gate driver GD is provided in the non-display area NDA along a side of the display area DA which extends in the second direction Y, and the source driver SD is provided in the non-display area along a side of the display area DA which is closer to the connector CP. The gate driver GD and the source driver SD may be provided in another manner in the array substrate AR or provided outside the array substrate AR.

The connector CP includes a base layer 30 which extends from an end portion of the array substrate AR. One end portion of the base layer 30 is located closer to the center of the array substrate AR than the sealing member SL. That is, the base layer 30 extends to a position in a region surrounded by the sealing member SL. To be more specific, one end portion of the base layer 30 is located between the sealing member SL and the display area or the source driver SD.

Connection lines L are provided in the non-display area NDA and the connector CP. Portions of the connection lines L which extend to the connector CP are connected to a drive IC 31 mounted on the connector CP. Furthermore, the connection lines L extend toward an end portion of the connector CP, and are connected to pads P which are electrodes for external connection. In the example shown in FIG. 3, the pads P are arranged in the first direction X in the vicinity of the center of the connector CP in the first direction X. For example, the pads P are each formed to have a greater width than that of each of the connection lines L, and are also formed integral with the connection lines L in the same manufacturing process as the connection lines L.

FIG. 4 is a view schematically showing an example of the cross section of the liquid crystal display panel PNL. It shows as an example of a structure applicable to the liquid crystal display panel PNL, a transmissive liquid crystal display device using a twisted nematic (TN) mode. The mode of the liquid crystal display panel PNL is not limited to the TN mode. That is, in switching of liquid crystal molecules, for example, a vertically aligned (VA) mode in which an electric field acting in a direction substantially perpendicular to a main surface of the substrate, or an in-plane switching (IPS) mode and a fringe field switching (FFS) mode in which an electric field acts in a direction substantially parallel to the main surface of the substrate may be applied.

As shown in FIG. 4, the array substrate AR includes a first insulating substrate 10 having a light transmissive property, such as a glass substrate or a resin substrate. The first insulating substrate 10 includes a first main surface 10A which faces the counter-substrate CT and a second main surface 10B which is located opposite to the first main surface 10A. The second main surface 10B is a surface which faces the backlight BL.

Furthermore, the array substrate AR comprises an undercoat layer 11, a first insulating layer 12, a second insulating layer 13, a thin-film transistor Tr, pixel electrodes PE, a first alignment film AL1, etc., between the first insulating substrate 10 and the liquid crystal layer LC.

The first main surface 10A of the first insulating substrate 10 is covered by the undercoat layer 11. The thin-film transistor Tr is formed on the undercoat layer 11. In the example shown in FIG. 4, the thin-film transistor Tr is of a top-gate type, but it may be of a bottom-gate type. The thin-film transistor Tr includes a semiconductor layer SC formed on the undercoat layer 11. The semiconductor layer SC is covered by the first insulating layer 12. Also, the first insulating layer 12 is located on the undercoat layer 11.

A gate electrode WG of the thin-film transistor Tr is formed on the first insulating layer 12, and located just above the semiconductor layer SC. The gate electrode WG is electrically connected to a gate line G, and covered by the second insulating layer 13. The gate electrode WG may be formed integral with the gate line G. Furthermore, the second insulating layer 13 is also formed on the first insulating layer 12.

The undercoat layer 11, the first insulating layer 12 and the second insulating layer 13 can be formed of an inorganic material such as a silicon oxide or a silicon nitride.

A source electrode WS and a drain electrode WD of the thin-film transistor Tr are formed on the second insulating layer 13. Also, the source lines S are formed on the second insulating layer 13. The source electrode WS is electrically connected to a source line S. The source electrode WS may be formed integral with the source line S. The source electrode WS contacts the semiconductor layer SC through a contact hole CH1 extending through the first insulating layer 12 and the second insulating layer 13, and the drain electrode WD contacts the semiconductor layer SC through a contact hole CH2 extending through the first insulating layer 12 and the second insulating layer 13. The thin-film transistor Tr is covered by the third insulating layer 14. The third insulating layer 14 is also located on the second insulating layer 13. The third insulating layer 14 is formed of an organic material such as a transparent resin, and serves to provide a flat surface by covering irregularities made by the thin-film transistor Tr.

A pixel electrode PE is formed on the third insulating layer 14. The pixel electrode PE contacts the drain electrode WD of the thin-film transistor through a contact hole CH3 extending through the third insulating layer 14. The pixel electrode PE is formed of a transparent conductive material such as indium tin oxide (ITO) or indium zinc oxide (IZO). The pixel electrode PE is covered by the first alignment film AL1. The first alignment film AL1 is also located on the third insulating layer 14.

On the other hand, the counter-substrate CT comprises a second insulating substrate 20 having a light transmissive property, such as a glass substrate or a resin substrate. The second insulating substrate 20 includes a first main surface 20A which faces the array substrate AR and a second main surface 20B which is located opposite to the first main surface 20A.

The counter-substrate CT further comprises a light-shielding layer 21, a color filter layer 22, an overcoat layer 23, a common electrode CE, a second alignment film AL2, etc.

The light-shielding layer 21 is formed on the first main surface 20A of the second insulating substrate 20. The light-shielding layer 21 is formed in such a way as to define pixels PX, and located opposite to the contact hole CH3 and lines provided in the array substrate AR, such as the gate lines G, the source lines S and the thin-film transistor Tr, etc. The light-shielding layer 21 is formed of, for example, a metallic material having a light-shielding property or a black resin material.

The color filter layer 22 is formed on the first main surface 20A of the second insulating substrate 20, and is partially in contact with the light-shielding layer 21. The color filter layer 22 includes color filters having different colors, for example, red, blue and green filters. The color filters are formed of, for example, a resin material. The red filter is provided in a red pixel; the green filter is provided in a green pixel; and a blue filter is provided in a blue pixel. It should be noted that the color filter layer 22 may further include a white or transparent filter. The boundaries between the color filters having different colors are located in positions corresponding to those of portions of the light-shielding layer 21.

The overcoat layer 23 covers the color filter layer 22. Also, the overcoat layer 23 is formed of a transparent resin material.

The common electrode CE is formed on a surface of the overcoat layer 23 which faces the array substrate AR. The common electrode CE is formed of a transparent conductive material such as ITO or IZO. Also, the common electrode CE is covered by the second alignment film AL2.

A first optical element OD1 including a first polarizer PL1 is provided on the second main surface 10B of the first insulating substrate 10. A second optical element OD2 including a second polarizer PL2 is provided on the second main surface 20B of the second insulating substrate 20. The first polarizer PL1 and the second polarizer PL2 are located to have a cross-Nicol positional relationship in which their polarization axes cross each other.

FIG. 5 is a view schematically showing the cross section of part of the liquid crystal display device DSP which is close to an end portion thereof at which the connector CP is provided. In the figure, of the elements of the liquid crystal display panel PNL, elements which need to be referred to in explanations of the connector CP and the elements of the backlight BL are shown, and the other elements are omitted.

In the example shown in FIG. 5, an end portion of the array substrate AR (the first insulating substrate 10) is substantially aligned with that of the counter-substrate CT (the second insulating substrate 20), with the sealing member SL interposed between those substrates, the sealing member SL being located close to the end portions of the substrates. However, it is not necessary that the end portions of the array substrate AR and the counter-substrate CT are aligned with each other; that is, one of the end portions may be further projected than the other.

The base layer 30 of the connector CP is formed on the first main surface 10A of the first insulating substrate 10. It is also possible to adopt a structure in which between the base layer 30 and the first main surface, another layer is interposed. One of end portions of the base layer 30, as shown in FIG. 3, is supported by elements which are located closer to the center of the array substrate AR (the left side of FIG. 3) than the sealing member SL, and formed above the first main surface 10A and the base layer 30. The other end portion of the base layer 30 is a fee end, and located outward of the first main surface 10A.

The base layer 30 is formed of a material having flexibility (or softness) and an insulation property. As such a material, for example, an organic insulating material such as polyimide can be used. Since the base layer 30 is flexible, it can be freely bent from the part formed on the first main surface 10A.

A connection line L extends such that one of ends of the connection line L is located on the first main surface 10A (or the undercoat layer 11, the first insulating layer 12 or the second insulating layer 13), and the other end is located on the base layer 30. On the base layer 30, a pad P formed on the connection line L is electrically connected to a flexible wiring board 32 by an electrically conductive film such as anisotropic conductive film. Also, at the base layer 30, the drive IC 31 is mounted. The flexible wiring board 32 electrically connects the liquid crystal display device DSP and a module such as a control board of a certain device on which the display device is mounted. The pad P may be directly connected to the module without the flexible wiring board 32.

The third insulating layer 14 as shown in FIG. 4 covers part of the connection line L and the base layer 30 in the non-display area NDA. That is, the third insulating layer 14 and the base layer 30 overlap each other, as viewed in plan view. Furthermore, an end portion of the third insulating layer 14 is located between the sealing member SL and the first insulating substrate 10. That is, in the first embodiment, the third insulating layer 14, the base layer 30 and the sealing member SL all overlap each other in a certain area in plan view. Such a structure can have an enhanced force for holding the end portion of the base layer 30, and can thus enhance the mechanical strength of the connector CP.

On the base layer 30, a protective layer 33 is provided. The protective layer 33 substantially completely covers the entire surface of the base layer 30. Furthermore, the protective layer 33 covers the connection line L, the drive IC 31 and the flexible wiring board 32 located on the base layer 30.

The protective layer 33 thus prevents corrosion of the connection line L, the pad P, a connection terminal of the drive IC 31 which is for use in connection to the connection line L, a connection terminal of the flexible wiring board 32 which is for use in connection to the pad P, etc. Also, the protective layer 33 maintains the strength of the connector CP, and also prevents breaking of the connection line L and damage of the base layer 30.

In the example shown in FIG. 5, the protective layer 33 also covers a side surface of the second insulating substrate 20. In addition, the protective layer 33 includes a thin-film portion 33a which has a smaller thickness and is located between the side surface of the second insulating substrate 20 and the drive IC 31. Because of provision of the thin-film portion 33a, the connector CP can be easily bent.

At a side surface of an end portion of the first insulating substrate 10 at which the connector CP is provided, a cushion 34 having an arcuate surface is provided. The cushion 34 keeps at a given value or less the curvature of the connector CP at the time of bending the connector CP toward the backlight BL.

The protective layer 33 and the cushion 34 are formed of, for example, a resin material. In this case, the protective layer 33 and the cushion 34 can be formed by coating the resin material using, for example, a dispenser.

On the other hand, the approach portion AP of the light guide plate LG includes a third surface F3 which faces a second surface F2 of the main light guide portion ML and a fourth surface F4 which is located opposite to the third surface F3. In the example shown in FIG. 5, the second surface F2 and the third surface F3 are located to face each other, with no member interposed between them. That is, space SP is provided between the second surface F2 and the third surface F3. The space SP can also be referred to as an air layer or a gap.

The fourth surface F4 is inclined with respect to the third surface F3. To be more specific, the fourth surface F4 is inclined with respect to the third surface F3 such that the thickness of the approach portion AP gradually decreases from the first end portion E1 toward the second end portion E2. In the example shown in FIG. 5, since the first surface F1, the second surface F2 and the third surface F3 are parallel to each other, the fourth surface F4 is also inclined with the first surface F1 and the second surface F2.

The first end portion E1 (an end surface located opposite to the light source LS or an incidence surface) is inclined with respect to the first surface F1, the second surface F2 and the third surface F3 such that its side closer to the third surface F3 slightly projects toward the center side of the main light guide portion ML (the left side of FIG. 5).

The second end portion E2 of the approach portion AP is connected to the main light guide portion ML. The approach portion AP and the main light guide portion ML are formed of, for example, the same material, and integral with each other. As a result, a connection portion between the approach portion AP and the main light guide portion ML can be formed with no optical interface.

In FIG. 5, an example of the path of light which is emitted from the light source LS to propagate in the light guide plate LG is indicated by a broken line.

That is, light emitted from the light source LS enters the approach portion AP from the first end portion E1, propagates from the first end portion E1 toward the second end portion E2, then enters the main light guide portion ML from the second end portion E2, and propagates in the main light guide portion ML toward another end portion (the left side of FIG. 5). The light propagating in the main light guide portion ML is emitted from the first surface F1. As means for causing the light to be emitted from the first surface F1, the following means can be adopted; reflective dots provided at the second surface F2; and members for scattering light such as foams, which are provided in the main light guide portion. In order that the brightness of the first surface F1 be made uniform, such reflective dots or scattering members may be provided such that the density of the dots or scattering members increases from an end portion closer to the approach portion AP toward the other end.

As an example of a conventional light guide plate, a light guide plate is present which includes a thick end portion located opposite to a light source, a prism portion whose thickness gradually decreases from the end portion, and a waveguide portion for homonizing light, which diffuses light transmitted to the entire surface of the light guide plate through the prism portion, those portions being located to opposite to the non-display area. For example, in the case where the thickness of the light guide plate is approximately 0.3 mm, and the height of the light source is approximately 0.5 to 0.6 mm, the length of the prism portion is approximately 2 mm, and the total length of the prism portion and the waveguide portion is approximately 4 to 7 mm.

In the first embodiment, the approach portion AP doubles as the prism portion and the waveguide portion; that is, it has both the functions of those portions. However, the approach portion AP need not always to have the complete function of the waveguide portion; i.e., it may be formed to diffuse and make the light emitted from the light source LS uniform to some extent. In this case, part of main light guide portion ML (which is located opposite to the non-display area NDA) can be used as the waveguide portion.

For example, as in the above example, the thickness of the main light guide portion ML is approximately 0.3 mm, the height of the light source LS (the length thereof along the first end portion E1) is approximately 0.5 to 0.6 mm, and the length of the approach portion AP is approximately 2 mm.

The angle at which the fourth surface F4 is inclined with respect to the third surface F3 can be set to an appropriate value in view of an aspect in which light can be efficiently propagated from the approach portion AP to the main light guide portion ML, and other factors to determine the shape of the light guide plate LG.

In the example shown in FIG. 5, the second end portion E2 of the approach portion AP and the end portion of the main light guide portion ML are aligned with the end portion of the array substrate AR (the end portion of the first insulating substrate 10) and the end portion of the counter-substrate CT (the end portion of the second insulating substrate 20) such that those end portions form a single flat surface. The second end portion E2 and the end portion of the main light guide portion ML may form a surface having another shape, for example, a curved surface which projects outwards. Furthermore, at the surface formed by the second end portion and the end portion of the main light guide portion ML, a reflective member may be provided which reflects light traveling from the approach portion AP and the main light guide portion ML toward the outside into the inside thereof.

An example of a method for manufacturing the liquid crystal display device PNL and the liquid crystal display device will be explained with reference to FIGS. 6 to 8.

First of all, in a plurality of regions defined above a first insulating substrate 10 having a great size, elements of an array substrate AR, which include a base layer 30, a connection line L, etc., are formed; and the regions are cut out from the first insulating substrate 10 having a great size, thereby forming then array substrate AR. On the other hand, in a plurality of regions defined above a second insulating substrate 20 having a great size, elements of a counter-substrate CT are formed; and the regions are cut out from the second insulating substrate 20 having a great size, thereby manufacturing the counter-substrate CT. Then, a sealing member SL is applied and a liquid crystal material is dropped on one of the array substrate AR and the counter-substrate CT, and those substrates are joined to each other. The liquid crystal material uniformly spreads between the substrates to form a liquid crystal layer LC. The liquid crystal material may be injected into the gap between the substrates after they are joined to each other.

As a result, such a liquid crystal display device DSP as shown in FIG. 6 is manufactured. At this stage, the entire base layer 30 is located on the first main surface 10A of the first insulating substrate 10, and an end portion of the first insulating substrate 10 which is closer to the scattering CP projects further outwards than the counter-substrate CT.

Next, as shown in FIG. 7, a drive IC 31 and a flexible wiring board 32 are mounted on a scattering CP, forming a protective layer 33.

Figure 8:
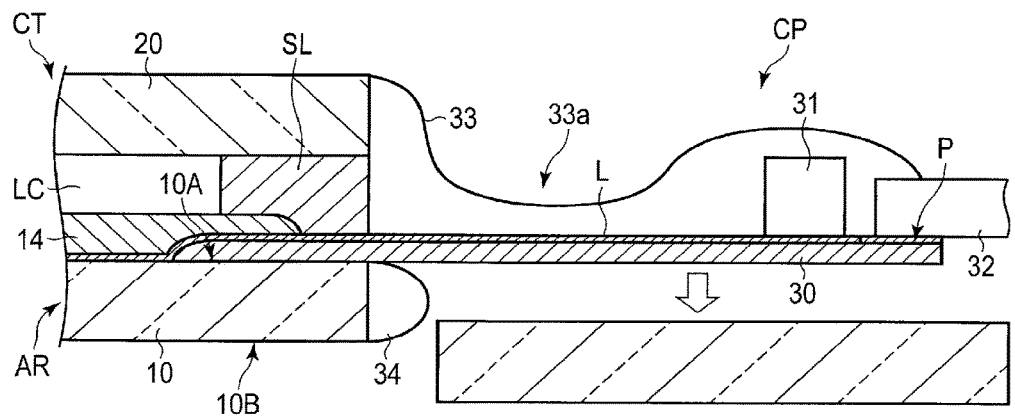
FIG. 8 is a view for explaining an example of a further process of the method of manufacturing the liquid crystal display panel and the liquid crystal display device.

Then, as shown in FIG. 8, part of the first insulating substrate 10 is removed from a lower side of the base layer 30, an end portion of the first insulating substrate 10 and an end portion of the second insulating substrate 20 are aligned with each other, and a cushion 34 is formed at the end portion of the first insulating substrate 10. Thereby, a liquid crystal display panel PNL including the scattering CP is completely formed. In the liquid crystal display panel PNL, a first optical element OD1 and a second optical element OD2 are provided, and are joined to a backlight BL, thereby completely forming a liquid crystal display device DSP.

Part of the first insulating substrate, which is located below the base layer 30, can be removed by a stripping process using, for example, a Laser Lift Off (LLO) method. In the stripping process, for example, a laser beam emitted from an excimer laser is radiated on part of the first insulating substrate 10 which is to be removed, from the second main surface 10B, whereby a first main surface 10A of the first insulating substrate 10 and the base layer 30 are separated from each other. As the excimer laser, for example, a xenon chloride (XeCl) excimer laser can be used. Furthermore, the part of the first insulating substrate 10 which is to be removed can be removed by mechanically cutting the first insulating substrate along the boundary between the above part and the other part. In the case of using such an LLO method, the base layer 30 can be formed of a material which absorbs a laser beam having a wavelength of ultraviolet region, for example, 380 nm or less, and has a heat resistance up to 250° C. or more. The above polyimide is suitable for the LLO method.

Figure 9:
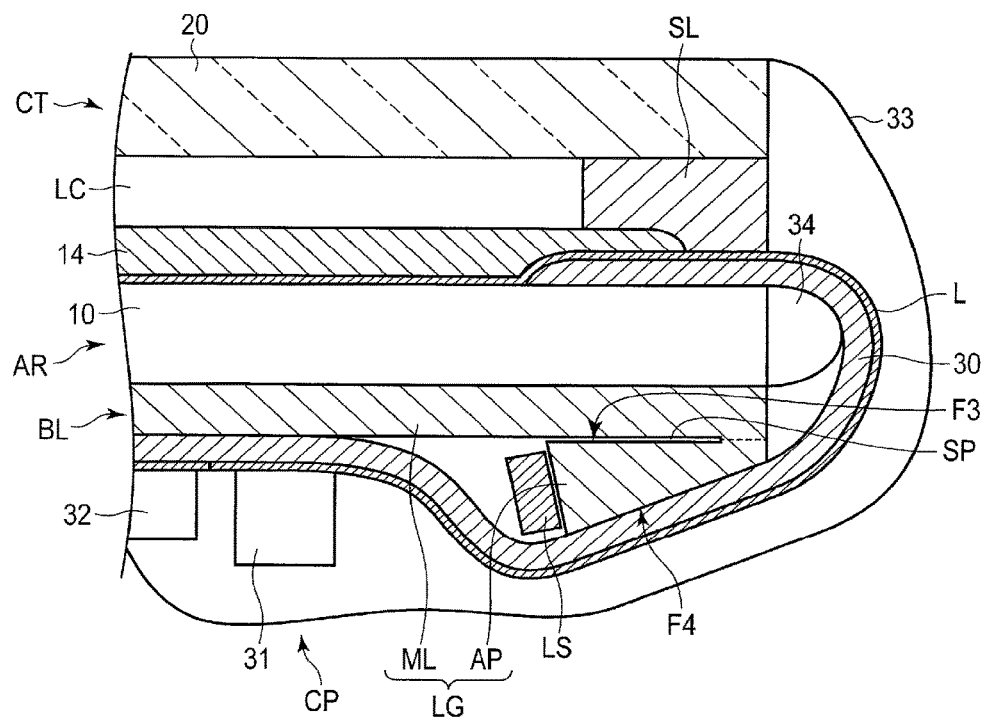
FIG. 9 is a view showing a state of the liquid crystal display device, which is incorporated in an apparatus.

A state of the liquid crystal display device DSP incorporated in an apparatus will be explained. The liquid crystal display device DSP can be incorporated in an apparatus, with the connector CP bent to a reverse surface side of the backlight BL through substantially 180°, as shown in, for example, FIG. 9. The connector CP shown in FIG. 9 is longer than that shown in each of FIGS. 5-7.

The bent connector CP may be fixed to the reverse surface (for example, the second surface F2) of the backlight BL by an adhesive agent or it may be provided unfixed. Also, even if being unfixed, the connector CP can be kept bent as long as it is supported by, for example, another module, member or housing mounted in the device.

The connector CP is relatively gently bent along the cushion 34, and is thus prevent from breaking the connection line L and damaging the base layer 30 when it is bent. Also, the cushion 34 prevents the base layer 30 from being damaged by the end portion of the mechanically cut first insulating substrate 10. Although FIG. 9 shows that the connector CP has been bent through substantially 180°, it can be incorporated into the apparatus, while it is bent in another state.

As explained above, according to the first embodiment, the backlight BL includes the approach portion AP located closer to the second surface F2 of the main light guide portion ML, and the light source LS is located to face the first end portion E1 of the approach portion AP. That is, in an ordinary light guide plate, since an approach portion (a prism portion and a waveguide portion) to be provided in a direction parallel to a main surface of the light guide plate is entirely or partially laid over the main surface, the size of a backlight BL as viewed in plan view can be reduced. Thereby, the size of the liquid crystal display device DSP provided with the backlight BL can also be reduced.

Furthermore, the liquid crystal display device DSP according to the first embodiment can be mounted on the apparatus, with the connector CP freely bent. The housing, internal structure, etc. of the apparatus can be more freely designed. Thereby, it is possible to optimize space necessary for connection between the liquid crystal display device DSP and modules of the apparatus, and also to reduce the display size of the apparatus, while maintaining that of the liquid crystal display device DSP.

Furthermore, in a conventional display device, there is a case where it is mounted on an apparatus, with a flexible wiring board bent, which is provided to connect the display device and modules. In this case, if the flexible wiring board is bent with a great curvature, it breaks a line. On the other hand, in the liquid crystal display device DSP according to the first embodiment, even in the case where the flexible wiring board is bent, its curvature can be reduced by bending the connector CP to adjust the position of the pad P.

Also, in the conventional liquid crystal display device, it is necessary provide a connection region in which a pad for connection of the flexible wiring board, etc., are provided, on an insulating substrate of an array substrate. Hence, the size of the array substrate is increased due to provision of the connection region, and thus a frame cannot be made sufficiently narrow. On the other hand, in the liquid crystal display device DSP according to the first embodiment, since a connection region for the pad, etc., does not need to be provided on the first insulating substrate 10 of the array substrate AR, the ratio of the display area DA to the area of the display surface of the liquid crystal display panel PNL can be increased, and the liquid crystal display device can be made to have a narrower frame. Such an advantage can be more remarkably clarified by the structure of the backlight BL according to the first embodiment.

Furthermore, various advantages can be obtained by the first embodiment.

Second Embodiment

The second embodiment will be explained. The following explanation of the second embodiment refers to differences between the first embodiment and the second embodiment, and explanations of elements and functions identical or similar to those of the first embodiment will be omitted.

Figure 10:
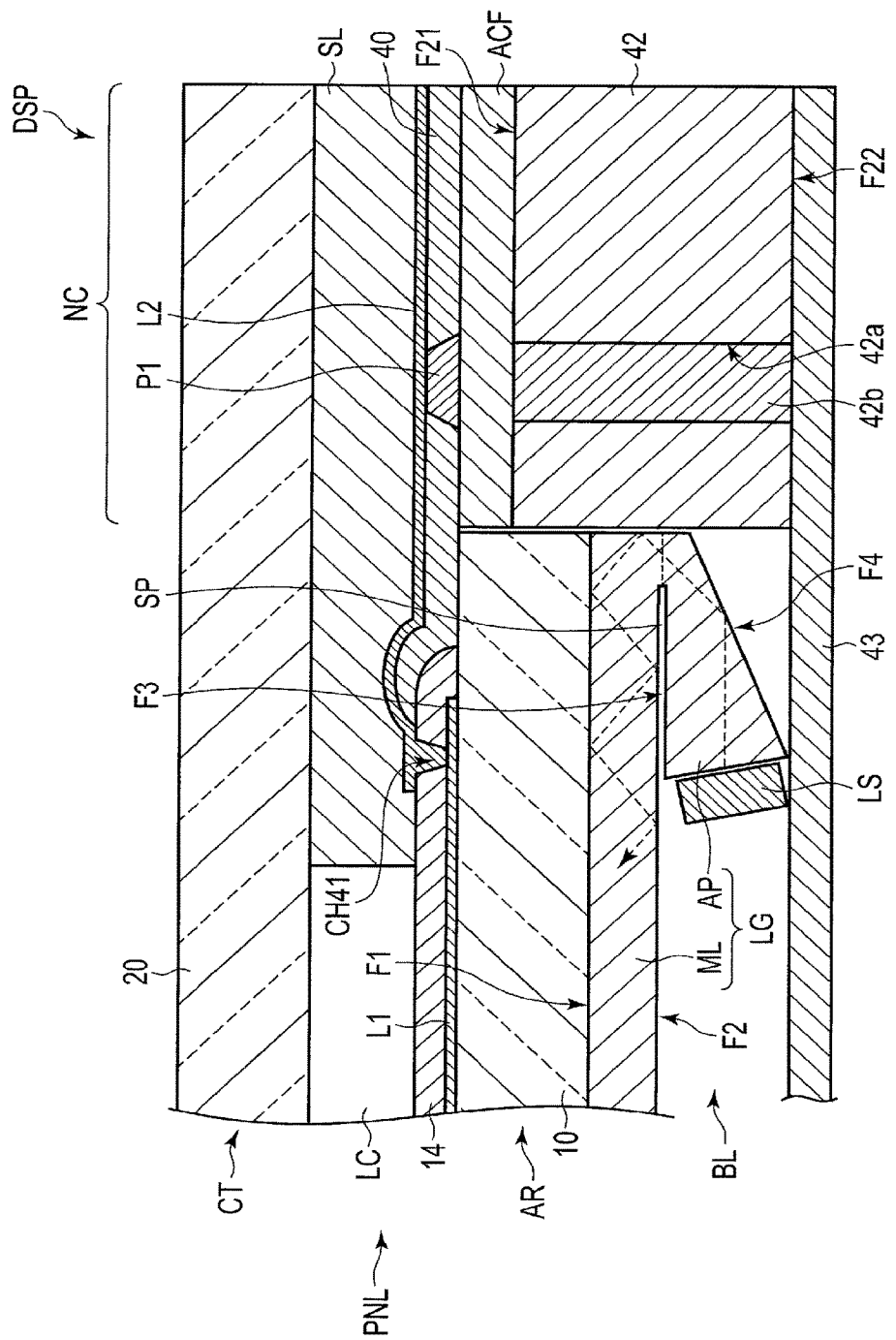
FIG. 10 is a view schematically showing the cross section of part of a liquid crystal display device according to a second embodiment, which includes an end portion thereof and the vicinity of the end portion.

FIG. 10 is a view schematically showing the cross section of part of a liquid crystal display device DSP according to the second embodiment, which includes an end portion thereof at which a connector CP is provided, and the vicinity of the end portion. In the figure, of the elements of a liquid crystal display panel PNL, elements which need to be referred to in explanations of the connector CP and the elements of a backlight BL are shown, and the other elements are omitted.

In the second embodiment, a counter-substrate CT has a larger outer shape than an array substrate AR. To be more specific, the counter-substrate CT includes a non-opposed region NC which is not located opposite to the array substrate AR, at an end portion as shown in FIG. 10. For example, the non-opposed region NC is provided and elongated along the end portion shown in FIG. 10, and with respect to remaining three sides, end portions of the array substrate AR and the counter-substrate CT are aligned with each other.

At an end portion of the array substrate AR which is shown, a first connection line L1 extends. The first connection line L1 is covered by a third insulating layer 14. The first connection line L1, as well as the connection line L in the first embodiment, is electrically connected to a gate driver GD and a source driver SD.

Adjacent to the third insulating layer 14, for example, an extension layer 40 formed of, for example, polyimide, is provided. In the example shown in FIG. 10, the extension layer 40 is provided on an end portion of the third insulating layer 14.

On the end portion of the third insulating layer 14 and the extension layer 40, a second connection line L2 is provided. The second connection line L2 is electrically connected to the first connection line L1 through a contact hole CH41 provided in the third insulating layer 14.

The sealing member SL also extends to the non-opposed region NC. The sealing member SL covers the third insulating layer 14, the second connection line L2 and the extension layer 40.

In the non-opposed region NC, at the extension layer 40, a pad P1 electrically connected to the second connection line L2 is formed. The pad P1 is an example of a terminal portion, and electrically connected to a thin-film transistor Tr by the first connection line L1, the second connection line L2, a gate driver GD or a source driver SD. The liquid crystal display device DSP comprises first connection lines L1, second connection lines L2 and pads P1, as in the first embodiment, in which the connection lines L and the pads P are provided. The structures of the first connection lines L1, the second connection lines L2 and the pads P1 are the same as those as shown in FIG. 10.

A surface of part of the extension layer 40 which projects from the array substrate AR is coated with an anisotropic conductive film ACF, and bonded to a first surface F21 of a transmission member 42, with the anisotropic conductive film ACF interposed between them. To a second surface F22 of the transmission member 42 which is located opposite to the first surface F21, a flexible wiring board 43 is connected. On a side where the second surface F2 of the main light guide portion ML, the flexible wiring board 43 extends toward the center of the liquid crystal display panel PNL (the left side of FIG. 10), and is electrically connected to modules of a device on which the liquid crystal display device DSP is mounted, such as a control board.

The transmission member 42 is a printed circuit including a via hole 42a which is, for example, a through hole, and is electrically connected to a pad P1 and the flexible wiring board 43 by a conductive member 42a in the via hole 42a.

In such a structure, a signal for driving a pixel PX, which is supplied from the flexible wiring board 43, is transmitted to the pad P1 by the transmission member 42, and further transmitted to he gate driver GD, the source driver SD, etc., through a second connection line L2 and a first connection line L1.

In manufacturing the liquid crystal display panel PNL, the extension layer 40, the second connection line L2 and other elements are formed on the first insulating substrate 10, which is extended to, for example, at the beginning, the non-opposed region NC, to thereby manufacturing an array substrate AR; and the array substrate AR and the counter-substrate CT are bonded to each other by the sealing member SL. Then, part of the first insulating substrate 10, which corresponds to the non-opposed region NC, is removed in the same procedure as in the stripping process, and the first optical element OD1, the second optical element OD2 and the backlight BL are provided. Furthermore, the transmission member 42 is coated with an anisotropic conductive film ACF, and bonded to the first insulating substrate 10.

In the liquid crystal display device DSP including the liquid crystal display panel PNL according to the second embodiment, it is possible to extend the flexible wiring board 43 toward the second surface F2 of the main light guide portion ML without bending it. It is therefore possible to reduce space required to be provided in an apparatus on which the liquid crystal display device DSP is mounted. Furthermore, it is possible to prevent occurrence of a problem such as breaking of the flexible wiring board 43.

Third Embodiment

The third embodiment will be explained. The third embodiment relates to a modification of the structure of the light guide plate LG, and can be applied to any of the first and second embodiments and other embodiments which will be described later.

FIG. 11 is a view schematically showing the cross section of part of a light guide plate LG according to the third embodiment, which includes an end portion thereof and the vicinity of the end portion. In the structure shown in FIG. 11, between the second surface F2 of the main light guide portion ML and the third surface F3 of the approach portion AP, a reflective layer Rf is provided in place of the space SP. In this regard, the third embodiment is different from the other embodiments. The reflective layer Rf returns light leaking from the third surface F3 to the approach portion AP, and also light leaking from the second surface F2 to the main light guide portion ML.

By virtue of provision of the reflective layer Rf, it is possible to prevent light from leaking from the third surface F3 to enter the second surface F2, and guide light diffused and made uniform at the approach portion AP through a connection portion close to the second end portion E2. Also, light leaking from the second surface F2 can be returned to the main light guide portion ML.

The reflective layer Rf may be extended over the entire second surface F2. Also, a further reflective layer Rf may be provided on the fourth surface F4 of the approach portion AP.

Fourth Embodiment

The fourth embodiment will be explained. The following explanation of the forth embodiment refers to differences between the forth embodiment and the first embodiment, and explanations of elements and functions identical or similar to those of the first embodiment will be omitted.

Figure 12:
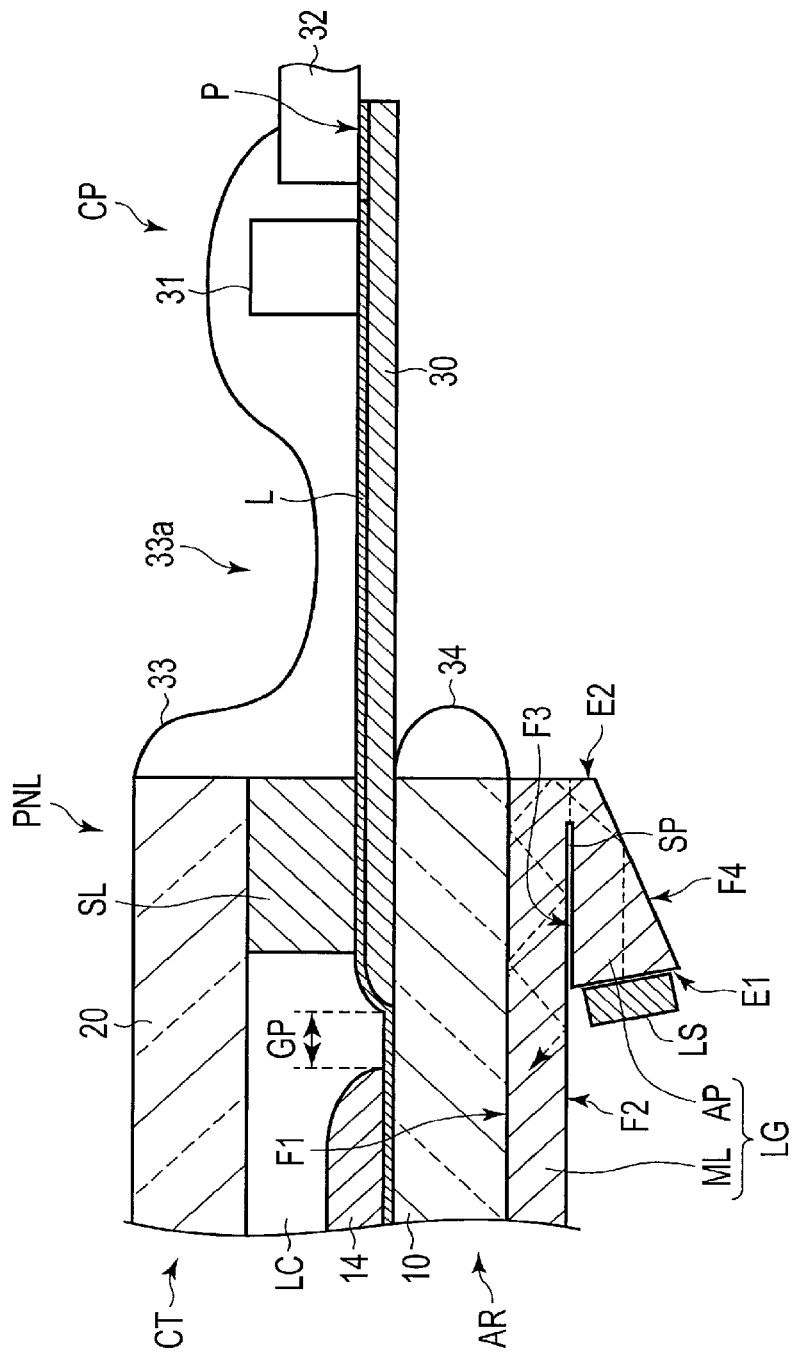
FIG. 12 is a view schematically showing the cross section of part of a liquid crystal display device according to a fourth embodiment, which includes an end portion thereof and the vicinity of the end portion.

FIG. 12 is a view schematically showing the cross section of part of a liquid crystal display panel PNL of a liquid crystal display device DSP according to the fourth embodiment, which includes an end portion thereof at which a connector CP is provided, and the vicinity of the end portion. In the structure shown in FIG. 12, as viewed in plan view, a third insulating layer 14 and a base layer 30 do not overlap each other. In this regard, the structure is different from that shown in FIG. 5.

To be more specific, although the position of an end portion of the base layer 30 is the same as that shown in FIG. 5, an end portion of the third insulating layer 14 is located closer to the center of an array substrate AR (the left side of FIG. 12) than that shown in FIG. 5, and a gap GP is provided between the end portions of the base layer 30 and third insulating layer 14.

A third insulating layer 14 is formed of an organic material, and is easily corroded by moisture. Therefore, in the case where as shown in FIG. 5, the third insulating layer 14 extends into space between a sealing member SL and the base layer 30, if moisture enters the space between the sealing member SL and the base layer 30, there is a risk that the third insulating layer 14 may be corroded by the moisture.

On the other hand, in the fourth embodiment, since the end portion of the base layer 30 is separated by the end portion of the third insulating layer 14 by the gap GP, even if moisture enters the structure, the third insulating layer 14 is not easily corroded by the moisture. Therefore, the reliability of the liquid crystal display device DSP can be improved.

Fifth Embodiment

The fifth embodiment will be explained. The following explanation of the fifth embodiment refers to differences between the fifth embodiment and the first embodiment, and explanations of elements and functions identical or similar to those of the first embodiment will be omitted.

FIG. 13 is a view schematically showing the cross section of part of a liquid crystal display panel PNL of a liquid crystal display device DSP according to the fifth embodiment, which includes an end portion thereof at which a connector CP is provided, and the vicinity of the end portion. In FIG. 13, as in the fourth embodiment, a gap GP is provided between an end portion of a third insulating layer 14 and that of a base layer 30, and in a connector CP, a connection line L is provided in the base layer 30. In this regard, the structure shown in FIG. 13 is different from that shown in FIG. 5.

To be more specific, in the fifth embodiment, the base layer 30 comprises a first base layer 30*a* and a second base layer 30*b*, and a connection line L is interposed between the first base layer 30*a* and the second base layer 30*b*. A drive IC 31 and a flexible wiring board 32 are provided on, for example, the second base layer 30*b*. In the second base layer 30*b*, for example, an opening is locally provided, and ensure an electrical connection between the second base layer 30*b*, and the connection line L, a pad P, a drive IC 31 and a flexible wiring board 32. It may be set that the second base layer 30*b* is provided only in a region closer to the array substrate AR than the drive IC 31, such that it is ensured that the second base layer 30*b* is electrically connected to the connection line L, the pad P, the drive IC 31 and the flexible wiring board 32.

The first base layer 30*a* and the second base layer 30*b* are formed of, for example, the same material, and to have the same thickness. For example, polyimide can be applied as the material of the first base layer 30*a* and second base layer 30*b*.

When the connector CP is bent, a great tensile stress acts on an outer peripheral surface of the connector CP. Therefore, in the structure shown in FIG. 5, when the connector CP is bent toward the backlight BL, there is a possibility that a great load will act on the connection line L, thus breaking the line.

On the other hand, in the fifth embodiment, since the connection line L is located in the base layer 30, it is possible to reduce the load which acts on the connection line L when the connector CP is bent, and thus prevent breaking of the line. In addition, the mechanical strength of the entire connector CP can be enhanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, with respect to the fifth embodiment, it is explained above that the gap GP is provided between the end portion of the third insulating layer 14 and that of the base layer 30, and in the connector CP, the connection line L is provided in the base layer 30, no gap GP may be provided as in the first embodiment.

The structure of the liquid crystal display panel PNL described above with respect to each of the embodiments can be applied to other kinds of display devices. Even if it is applied to any of the display devices, the same advantages can be obtained as in the embodiments by extending the connector CP from an end portion of a substrate where a switching element, etc., are formed as in the embodiments. Furthermore, the structure of the backlight BL described with respect to each of the embodiments can be applied to other kinds of illumination devices.

What is claimed is:
1. A display device comprising:
a backlight including a light source and a light guide plate which has an approach portion and a main light guide portion; and
a display panel including a first substrate opposed to the backlight, a pixel electrode formed above the first substrate in a display area in which an image is to be displayed, a switching element electrically connected to the pixel electrode, a wiring electrically connected to the switching element, a second substrate opposed to the first substrate, a sealing member sealing a liquid crystal layer between the first substrate and the second substrate in a peripheral area around the display area, and a base film formed on the peripheral area of the first substrate, wherein
the main light guide portion is formed in a shape of a flat plate, and includes a first surface facing the display panel and a second surface opposite to the first surface;
the approach portion includes a third surface facing the second surface, a fourth surface opposite to the third surface, a first end portion facing the light source, and a second end portion opposite to the first end portion and connected to the main light guide portion, the fourth surface being inclined with respect to the third surface;
the base film extends from a gap between a first end portion of the first substrate and a second end portion of the second substrate;
the first end portion and the second end portion are arranged directly above one another at a same position,
the base film includes a first end sandwiched between the first substrate and the sealing member, and a second end which is not located between the first substrate and the sealing member;
the first end is directly on the first substrate and is not connected to the first substrate by a terminal;
the base film seamlessly extends between the first end and the second end and the second end of the base film is located outside of the display panel;
the wiring extends from the display area to the base film;
a drive IC is mounted on the base film and is connected to the wiring; and
the base film is bent along the fourth surface and the second end portion.
2. The display device of claim 1, wherein the base film is bent so that the drive IC overlaps the display area.

3. The display device of claim 1, wherein the wiring is formed on a surface of the base film,
   the base film and the wiring which extend from the first end portion of the first substrate are covered with a protection layer, and
   the wiring and the protection layer are bent along the base film.

4. The display device of claim 1, wherein the wiring is provided in the base film.

5. The display device of claim 1, further comprising an insulating layer formed between the switching element and the pixel electrode,
   wherein the insulating layer covers part of the base film.

6. The display device of claim 1, further comprising an insulating layer formed between the switching element and the pixel electrode,
   wherein a gap is provided between an end portion of the insulating layer and the first end of the base film.

7. The display device of claim 1, wherein between the second surface and the third surface, space is provided.

8. The display device of claim 1, wherein the fourth surface is inclined with respect to the third surface such that a thickness of the approach portion gradually decreases from the first end portion toward the second end portion.

9. The display device of claim 1, wherein the main light guide portion and the approach portion are formed of the same material and integral with each other.

10. A display device comprising:
    a first substrate;
    a pixel electrode formed above the first substrate in a display area in which an image is to be displayed;
    a switching element electrically connected to the pixel electrode;
    a wiring formed above the first substrate and electrically connected to the switching element;
    a second substrate opposed to the first substrate; and
    a sealing member sealing a liquid crystal layer between the first substrate and the second substrate, wherein
    a base film is provided on a non-display area of the first substrate surrounding the display area, and has flexibility and an insulation property;
    the base film extends from a gap between a first end portion of the first substrate and a second end portion of the second substrate;
    the first end portion and the second end portion are arranged directly above one another at a same position,
    the base film extends from one of end portions of the first substrate to an outside of the first substrate and the second substrate;
    a first end of the base film is sandwiched between the first substrate and the sealing member;
    the first end of the base film is directly on the first substrate and is not connected to the first substrate by a terminal;
    a second end of the base film is not located between the first substrate and the sealing member and the second end of the base film is located outside of the first substrate and the second substrate;
    the base film seamlessly extends between the first end and the second end;
    the wiring extends from the display area to the base film; and
    a drive IC is mounted on an area of the base film which does not overlap the first substrate and the second substrate, and is connected to the wiring.

11. The display device of claim 1, wherein
    light from the light source enters the approach portion, is reflected at the fourth surface, and enters the main light guide portion.

* * * * *